July 29, 1969 R. B. FREEMAN 3,457,763
BLIND RIVET TOOL
Filed Nov. 30, 1966 3 Sheets-Sheet 1

INVENTOR.
RICHARD B. FREEMAN
BY Toler & Ornstein
ATTORNEYS.

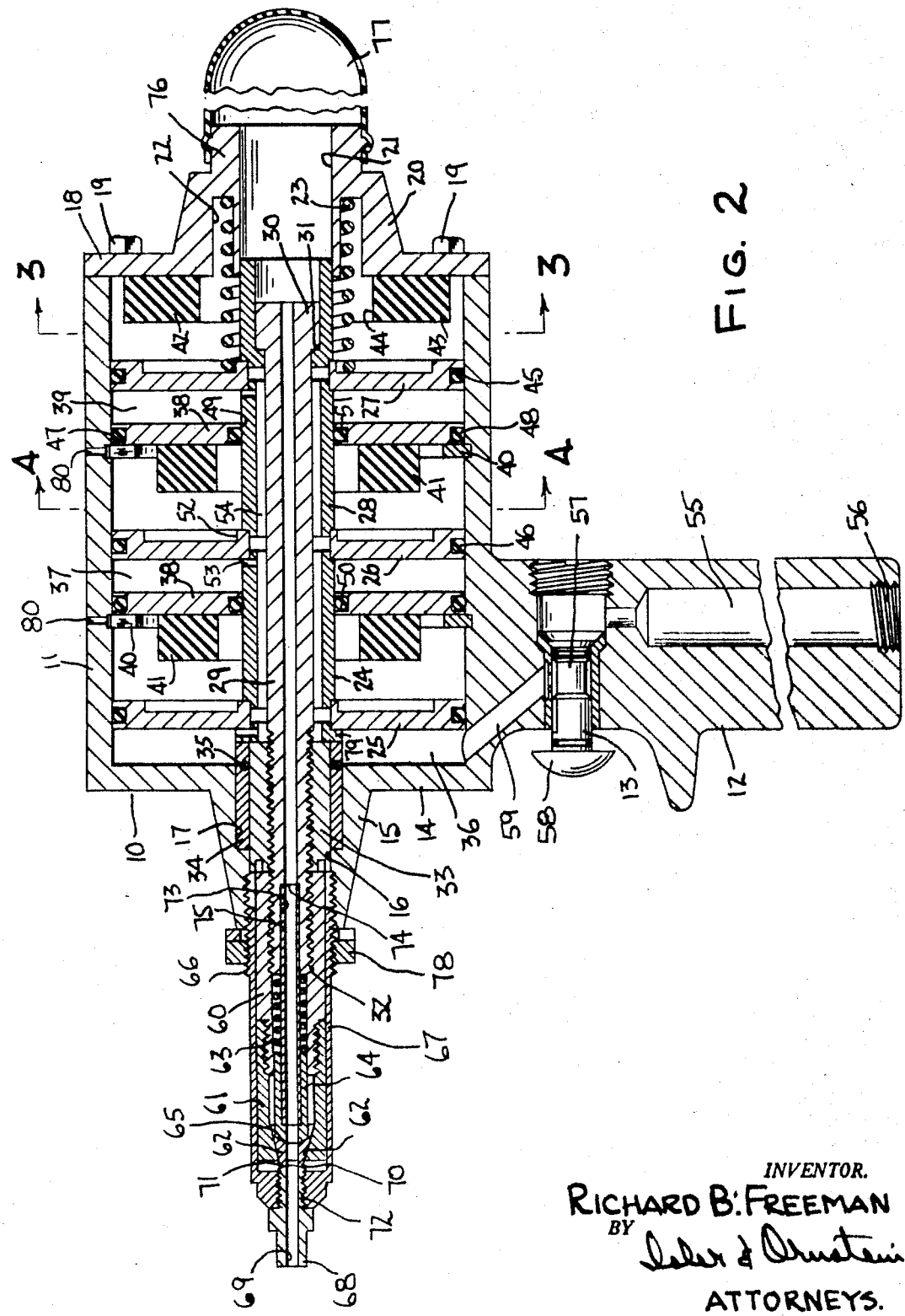

July 29, 1969 R. B. FREEMAN 3,457,763
BLIND RIVET TOOL
Filed Nov. 30, 1966 3 Sheets-Sheet 3

INVENTOR.
RICHARD B. FREEMAN
BY
ATTORNEYS.

United States Patent Office 3,457,763
Patented July 29, 1969

3,457,763
BLIND RIVET TOOL
Richard B. Freeman, Shaker Heights, Ohio, assignor to Scoville Manufacturing Company, Waterbury, Conn., a corporation of Connecticut
Filed Nov. 30, 1966, Ser. No. 597,997
Int. Cl. B21j 15/18
U.S. Cl. 72—391                                                         13 Claims

ABSTRACT OF THE DISCLOSURE

A pneumatic device adapted to be used as a power tool and provided with a plurality of pressure chambers defined by floating baffle plates and also provided with a multiple stage shock absorbing system to absorb the energy of retraction when the work load is relieved on the piston assembly; said multi-stage shock absorber including a first stage of compression of a resilient shock absorber and a second stage of compression which will not commence until after the first stage of compression is completed.

---

This invention relates generally to a pneumatic power tool adapted for the securement of blind rivets as structural fastening elements.

Blind rivets are well known in the art and require no extended explanation. They are used for the joinder or securement of structural elements, principally under circumstances where the openings provided for the rivets are accessible only from one side, so that the conventional practice of upsetting the inserted end of the rivet cannot be followed.

The blind rivet consists essentially of a shouldered or headed tubular rivet body, whose bore or central passageway is slidably traversed by an expendable mandrel. The mandrel has an enlarged portion which serves to upset or deform the rivet body as the mandrel is pulled or urged outwardly. The enlarged portion or head of the mandrel resists the pulling movement and, eventually, this resistance causes a fracture of the mandrel, leaving the enlarged portion within the rivet body while the remainder is completely withdrawn.

The tool herein described is intended to pull the mandrel while the rivet body is held in place in the blind opening.

It is a primary object of my invention to provide an improved tool of the character described.

Another object of my invention is to provide a tool of the character described which will be less subject to breakage than the tools heretofore provided for this purpose by the prior art.

A further object of my invention is to provide a tool of the character described which is compact in size and efficient in operation.

Other objects and advantages of my invention will become apparent during the course of the following description.

In the drawings, in which like reference numerals designate like parts throughout the same, FIG. 1 is a plan view of a blind rivet tool embodying the features of my invention.

FIG. 2 is a cross-sectional view, taken as indicated on line 2—2 of FIG. 1 and showing the parts of the tool as they appear prior to actuation of the tool.

Figure 1:
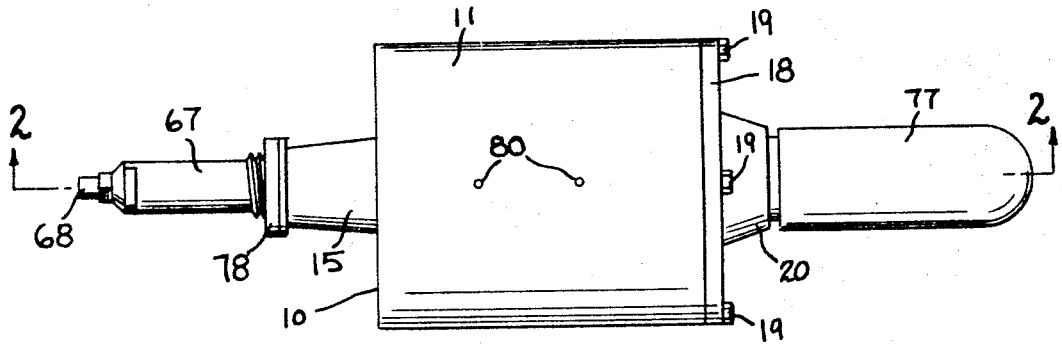
Figure 3:
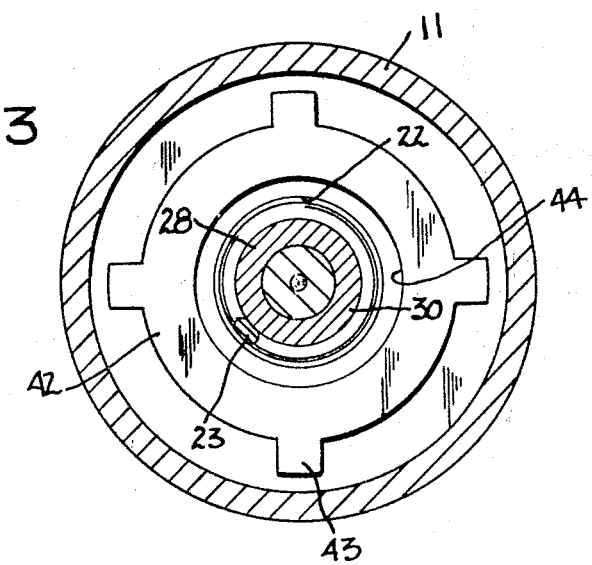
FIG. 3 is a cross-sectional view, taken as indicated on line 3—3 of FIG. 2.
Figure 4:
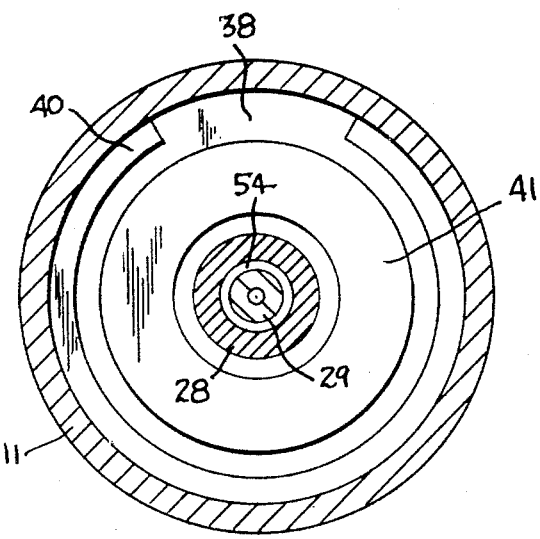
FIG. 4 is a cross-sectional view, taken as indicated on line 4—4 of FIG. 2.

Referring more particularly to the drawings, the tool includes a body 10 whose upper portion provides a cylindrical housing 11 for a piston assembly, to be described. The lower portion of the body 10 provides a piston grip 12 which houses an air valve assembly 13.

The housing 11 is provided with an integral forward wall 14 having an axially extending boss or projection 15 provided with a bore 16 and a counter-bore 17. The rearward open end of the cylinder housing 11 is closed or capped by means of a cover plate 18 which is removably secured to the end of the housing 11 by means of any suitable fasteners 19. The cover plate 18 is provided with a central rearwardly extending projection or boss 20 having an axial bore 21. The internal face of the boss 20 is provided with an annular recess 22 in which one end of a compression coil spring 23 is seated.

A multiple piston assembly 24 is operatively mounted within the cylindrical housing 11. In the embodiment shown, the assembly includes three disk-like pistons which are identical with each other but which have been designated for purposes of convenience by the reference numerals 25, 26 and 27. Each of the pistons is fixedly secured to a hollow rod or shaft assembly 28 which is movably mounted within the housing 11. The rearward end of the shaft assembly 28 is slidably received in the bore 21 of the cover plate 18. The shaft assembly 28 is clamped in assembled relationship by means of a hollow assembly bolt 29, the head 30 of which seats against an annular shoulder 31 which is provided adjacent the rearward end of the assembly 28. The forward end of the assembly bolt 29 is externally threaded as at 32 and threadedly receives a cylindrical nut 33 by means of which the clamping securement of the assembly 28 is completed. The nut 33 is slidably received in a guide bushing 34 which is fixed in the counter-bore 17 of the boss 15. The guide bushing is provided with an annular recess for retaining a sealing ring 35 which has wiping engagement with the periphery of the nut 33. As will more fully appear hereinafter, the shaft assembly 28 is moved longitudinally in one direction in response to the pressure forces acting upon the pistons secured thereto and is moved in the opposite direction in response to the action of the spring 23.

Each of the pistons 25–27 is associated with a pressure chamber all of which receive pressure from a common air pressure source. The forward or front chamber 36 in the cylindrical housing 11 is defined between the front face of the piston 25 and the interior face of the wall 14. The middle chamber 37 is defined between the front face of the piston 26 and a movable partition or baffle element 38. The rear chamber 39 is defined between the front face of the piston 27 and another movable baffle element 38.

Each of the baffle elements 38 is substantially disk-shaped and is slidably mounted on the shaft assembly 28. An annular retainer ring 40 is secured in the housing 11 forward of the baffle element 38 and serves as an abutment in the path of movement of the element 38 to limit the extent of its forward movement in the housing 11. Similarly, a like retainer ring 40 is disposed in the housing forward of the other baffle element 38, for the same purpose.

Affixed to the front face of each of the baffle elements 38 is an annular shock absorbing element in the form of a resilient or compressible ring 41. A comparable shock absorbing ring 42 is affixed to the interior face of the cover plate 18, but differs somewhat in form from the rings 41. The rings 41 and 42 all have the identical thickness and all have the same outside diameter. However, the internal diameter of the ring 42 is somewhat larger than that of the rings 41, so as to provide clearance for traversal of the spring 23 into the recess 22. In order that the ring 42 shall have the same diametrical cross-sectional area as the rings 41, the ring 42 is provided with the spaced radial projections 43 to provide additional surface area. The projections 43 are of the same thickness as the body of the ring 42 and are of such dimension as to compensate for the decrease in surface area of the ring 42 due to its enlarged central opening 44.

The periphery of each of the pistons 25, 26 and 27 is recessed, as at 45, to accomodate a sealing ring 46 which has wiping engagement with the wall of the cylindrical housing 11. Similarly, the periphery of each of the baffle elements 38 is provided with a recess 47 to accomodate a sealing ring 48 which engages the wall of the housing 11. Each of the baffle elements also is provided with a central opening or bore 49 which is provided with an annular recess 50 to retain a sealing ring 51 which slidably engages the shaft assembly 28. It will also be noted that the rearward face of each of the pistons 25, 26 and 27 is recessed, as at 52, and this annular recess is of sufficient diameter to accomodate the outside diameter of the compressible shock absorber rings. Immediately forward of the front face of each of the pistons, a rectangular opening 53 is provided in the shaft assembly 28. The openings 53 serve as air ports by means of which compressed air which is injected into the front chamber 36 is transferred through the hollow shaft assembly into the other chambers 37 and 39. The hollow interior of the shaft assembly serves as a manifold 54 which receives the compressed air from the chamber 36 and distributes it to the chambers 37 and 39.

The grip 12 of the tool body is provided with an inlet air passageway 55, which is internally threaded as at 56 to provide means for securing a compressed air hose or the like thereto. The passageway 55 communicates with a three-way valve assembly 57 which has an exposed actuating stem or button 58. When the valve button 58 is manually depressed, compressed air passes through the valve assembly into a connecting passageway 59 which communicates with the front chamber 36. When the valve button 58 is released, the pressure of the incoming air causes the valve to close, thus preventing any further communication between the passageways 55 and 59. However, in this closed position of the valve it permits the passageway 59 to communicate with atmosphere and thereby permits venting of the compressed air from the housing 11 to atmosphere.

The threaded end of the previously described assembly bolt 29 projects beyond the clamping nut 33 and threadedly engages one end of a tubular piston rod extension element 60, interiorly thereof. The other end of the element 60 is externally threaded for securement to the internal threads of a hollow collet body 61. Mounted in and projecting from the opposite end of the body 61 are a pair of cooperative externally tapered collet jaws 62 which are maintained in normally-closed position by the force of a coil spring 63 which bears upon one end of an expander element 64, whose other end is tapered, as at 65, and engages the rearward portions of the jaws 62 to cam them into gripping relationship. It will be apparent that the collet and piston rod extension move longitudinally with the movement of the rod assembly 28.

The bore 16 in the projection or boss 15 is internally threaded to engage the threaded end 66 of a hollow barrel housing 67 in which the collet assembly is received. The forward end of the barrel housing is tapped for securement thereto of a nose guide 68 having a central bore 69 therein. When the parts are assembled and the tool is inoperative, the forward beveled ends 70 of the jaws 62 are in abutment or engagement with the conical end 71 of the stem 72 of the nose guide. This inter-engagement tends to cause opening of the jaws 62 and the extent of such opening is determined inversely to the space or distance between the end 71 and the adjacent end of the collet body 61. Thus, the greater the retraction of the jaws into the collet body, the greater will be the opening between the jaws.

The assembly bolt 29 is counter-bored at 73 to provide a shoulder 74. A guide tube 75 is mounted and retained in the counter-bore 73 in axial alignment with the bore 69 in the nose guide and with the bore of the expander 64. In this way, an unobstructed passageway is provided for the mandrel of the blind rivet through the collet assembly and outwardly from the assembly bolt 29. The rearward boss 20 is provided with a flanged extension 76 of reduced diameter on which can be detachably mounted a resilient boot or bag 77 for the purpose of receiving and retaining the spent mandrels which are discharged from the end of the assembly bolt 29.

The operation of the device

In the operation of the device, the blind rivet is mounted on the tool by inserting the shank of the rivet into the bore of the nose guide 68. This bore 69 is of a predetermined diameter slightly greater than that of the rivet mandrel. The length of the stem 72 of the nose guide is of such predetermined dimension as to cause sufficient rearward displacement of the collet jaws 62 so that they will be maintained in an open position sufficiently large to accomodate the inserted rivet mandrel. Inasmuch as the rivet gun can be utilized with a range of rivet sizes, the nose guide 68 is provided in several sizes, each one of which differs in its diameter of the bore 69 and in the length of its stem 72. The larger the diameter of the bore, the longer the length of the stem 72 so as to cause greater opening of the collet jaws 62. One size of nose guide 68 is easily substituted or interchanged with another size by means of the threaded securement of the nose guide to the barrel housing 67. A lock nut 78 is provided on the threaded portion of the barrel housing 67 for the purpose of retaining the barrel housing in fixed position on the body of the tool. By relieving the lock nut 78, the barrel housing can be threaded inwardly or outwardly to effect a fine adjustment of the distance between the end 71 of the nose guide and the end of the collet body 61 so as to change the extent of the maintained opening of the collet jaws 62.

With the blind rivet mounted in the nose of the tool, the rivet is inserted in the hole or opening and held there against by the abutment of the forward end of the nose guide with the head of the rivet. The spring 23 acts upon the piston assembly 24 to position it forwardly in the cylindrical housing 11, the limit of this forward movement being defined by the abutment of the portion 79 of the shaft assembly 28 with the inner end of the guide bushing 34. As shown in FIG. 2 of the drawings, in this forward most position of the piston assembly 24, the front chamber 36 is exposed to and in communication with the air passageway 59.

The valve button 58 is now manually depressed to permit compressed air to pass through the valve into the passageway 59 and thereby into the front chamber 36 ahead of the piston 25. By means of the previously described air openings or ports 53 and the manifold 54, this compressed air is distributed equally to the other chambers 37 and 39 ahead of their respective pistons 26 and 27. The pressure of the air in the chambers acting upon the surface area of the pistons exerts a substantial force, on the order of 500 lbs., which readily overcomes the much smaller force of the spring 23, which may be on the order of 25 lbs., and causes the entire rod assembly 28 and its associated pistons to retract to the positions indicated in FIG. 5 of the drawings. During the retraction of the piston assembly, the collet body 61 is simultaneously retracted causing the collet jaws to close and grip the mandrel during the initial part of the retraction movement, and thereafter to draw or pull the mandrel through the rivet body.

Due to the pressure forces acting in the three chambers of the cylindrical housing 11, the baffle elements 38 are firmly positioned and retained against their respective retainer rings 40. During the rearward movement of the piston assembly, the atmospheric entrapped air behind the pistons 25 and 26 is vented to atmosphere through vent openings 80 provided in the housing 11. The entrapped air behind the piston 27 is vented through the bore 21, there being sufficient clearance to permit such venting.

The pulling action on the mandrel causes the desired expansion of the rivet body for setting the rivet. Eventually, the pressure forces acting upon the piston assembly 24 and thereby upon the mandrel of the rivet are sufficient to cause fracture of the mandrel with a consequent sudden and almost instantaneous release of the load on the piston assembly. This causes an abrupt and very forceful retraction movement of the piston assembly. It is at this point in the operation that most of the damage and injury is caused to the blind rivet tools of the prior art. However, in my improved form of tool, the shock absorbing arrangement serves to minimize the effect of the violent impact forces which are involved.

Figure 5:
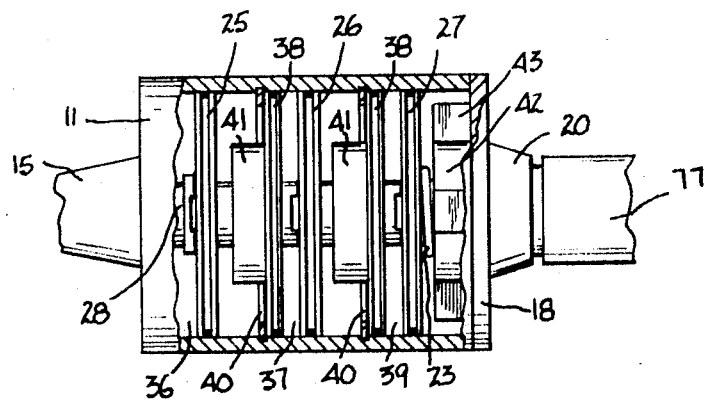
FIG. 5 is a fragmentary view, similar to FIG. 1, but showing the location of the parts during the initial stage of actuation of the tool.
Figure 6:
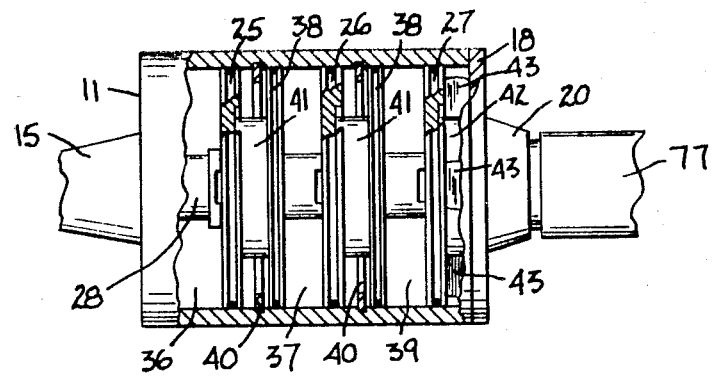
FIG. 6 is a view similar to FIG. 5, but showing the position of the parts at the time that fracture of the mandrel occurs.

As a result of the sudden decrease of load, the piston assembly moves from a position comparable to that shown in FIG. 5 to the position shown in FIG. 6 of the drawings. This movement is accompanied by a sudden decrease in the pressure within the chambers 36, 37 and 39, even though the flow of compressed air to the housing 11 has not been interrupted. The initial shock absorbing contact is between the rim of the rear face of the piston 27 and the radial projections 43 on the compressible ring 42. At this time there has not yet been any contact between any of the pistons and the main body of the compressible rings. This initial contact serves to absorb part of the shock and retard the rearward movement of the piston assembly.

As shown in FIG. 6 of the drawings, the rearward movement of the piston assembly continues causing compression of the projections 43 and also causing abutment of the recessed face 52 of each of the pistons with its corresponding shock absorbing ring 41 or 42, as the case may be. This causes some slight compression of the rings 41 and a consequent displacement rearwardly of the two baffle elements 38. At the same time, the rear piston 27 engages the ring 42 and causes initial compression of the main body of that ring. Thus, at this point in the impact, there has been no sudden arrest of the rearward movement of the piston assembly, but instead the shock absorbing effect has been modulated by the rearward displacement of the shock absorbing rings 41 carried by the baffle elements 38.

Figure 7:
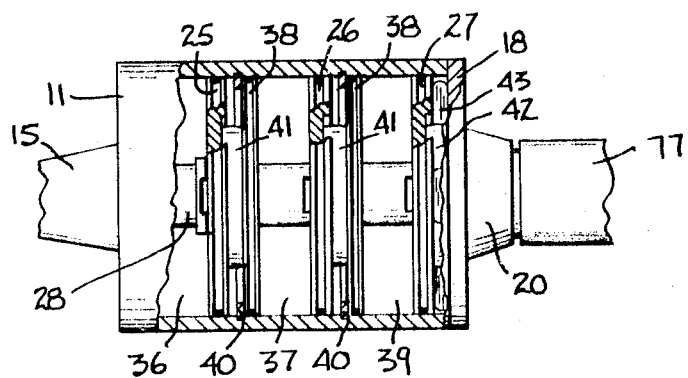
FIG. 7 is a view similar to FIG. 5, but showing the position of the parts after the fracture of the mandrel has occurred.

During the retardation of the rearward movement of the piston assembly, the air pressure in the chambers 36, 37 and 39 has again been building up to its maximum value. This causes further rearward movement of the piston assembly, while at the same time the build up of pressure reacts upon the rear face of each of the baffle elements 38 to cause it to advance toward abutment with its adjacent retaining ring 40. The movement of the baffle elements 38 in opposition to the movement of the pistons causes further compression of the shock absorbing rings 41 until an equilibrium of the forces involved is reached and further rearward movement of the piston assembly is terminated. This position of the parts is shown in FIG. 7 of the drawings and is maintained as long as the valve button 58 is still depressed. In this manner, the sudden rearward movement of the piston assembly is arrested in successive stages of shock absorption to minimize and modulate the impact forces which could cause damage to the parts.

At any time thereafter, the valve button 58 can be released to cause closing of the valve so that the air inlet passageway 59 is cut off from the passageway 55. At the same time, this closing movement of the valve brings the passageway 59 into communication with atmosphere and permits the compressed air within the cylinder housing 11 to be exhausted through the valve assembly 57. As the air in the chambers 36, 37 and 39 exhausts, the spring 23 becomes effective to advance the piston assembly and restore the parts to the position shown in FIG. 2 of the drawings. The consequent abutment of the collet jaws 62 with the conical end 71 of the nose guide 68, causes the jaws to open sufficiently to release the mandrel from gripping action. By tilting the tool bodily in one direction or the other, the fractured mandrel can be discharged by gravity either into the boot 77 or out of the forward end of the nose guide 68. The tool is then ready for a repetition of the operative cycle.

There are circumstances when it is desired to even diminish further the impact forces which result, as previously described, when the load on the tool is suddenly relieved. It will be noted that the application of the load to the tool occurs when the collet jaws 62 have been withdrawn to a sufficient extent from the end 71 of the nose guide 68 to cause the spring loaded jaws to frictionally grip the mandrel of the rivet. It is at this point in the operation of the device that the mandrel resists the retractive movement of the piston assembly and places a load upon the tool. If the static position of the jaws 62 is such that the opening in the jaws closely approximates the diameter of the mandrel to be gripped, then the gripping of the mandrel and the consequent loading of the tool will occur very early in the initial stage of retractive movement of the piston assembly. However, if the static position of the jaws 62 is such as to provide a substantially larger opening than the diameter of the mandrel to be gripped, then a greater extent of retractive movement of the piston assembly is permitted to occur before the jaws grip the mandrel and the tool is loaded. This delay or deferment in the gripping action of the jaws results in a shorter operative stroke of the piston assembly from the point of loading to the point of complete retraction, even though the length of stroke from the point of loading to the point of fracture of the mandrel is substantially uniform regardless of the jaw opening.

As previously mentioned, the threaded portion 66 of the barrel housing 67 permits some adjustment to be made which will affect the extent of opening of the jaws 62 when the collet body 61 is in its forwardmost position. This results from the variations which can be accomplished in the spacing between the inner end of the barrel housing 67 and the forward end of the collet body 61. By this means, the above-described adjustment in the stroke of the piston assembly can be accomplished.

However, this adjustment of stroke is of relatively minor proportions and may be considered as a "fine" adjustment whose range may be inadequate to shorten the length of stroke to the extent desired. Under such circumstances, a significant change or adjustment in the length of stroke of the piston assembly can be accomplished by threading the barrel assembly 67 further into the threaded housing projection 15 so as to cause the inner end of the barrel housing to abut and longitudinally displace the collet body 61 in opposition to the spring 23. Such an adjustment will, of course, also cause maximum opening of the jaws 62 in their static position and thereby will combine the maximum effect of the fine adjustment with the effect of the adjustment resulting from the physical longitudinal rearward displacement of the entire piston assembly. By empirical adjustment, especially when the tool is being employed with rivet mandrels of very small diameter, the stroke of the piston assembly can be modified so that the point of fracture or sudden release of load on the piston assembly will occur simultaneously with or just prior to the abutment of piston 27 with shock absorber portions 43. The piston assembly is thus permitted little or no acceleration of travel after the fracture point has occured and the potential impact force is snubbed before it has an opportunity to fully develop.

The barrel housing 67 can be used either for the fine adjustment affecting only the size of the opening of the jaws 62 in their static position, or the barrel housing may be adjusted to rearwardly displace the entire piston assembly to a position where the fracture of the mandrel will be substantially coincident with the abutment of the piston assembly with the first stage of the shock absorber ring 42. Under normal circumstances, only the "fine" adjustment of the barrel housing may be needed, but under special circumstances, such as where it is desired to minimize the vibration which may be transmitted to the workpiece by the impact force of the tool, the major shortening of effective stroke of the piston assembly by adjustment of the barrel housing 67 provides a significant advantage in actually preventing the full development of the impact force which would occur if the piston assembly were permitted to operate at its maximum length of stroke.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a fluid-pressure operated power tool, the combination of a pressure cylinder housing, a piston rod mounted for axial movement within said cylinder and adapted to engage a work load, a plurality of pistons, affixed to said piston rod in axially-spaced relationship thereon to provide a piston rod assembly, a baffle element movably mounted on said piston rod intermediate each pair of pistons and defining a plurality of pressure chambers within said cylinder, means for selectively supplying fluid under pressure to one face of said pistons to cause retraction of said piston rod assembly under load, a multistage shock-absorber disposed in the path of retractive movement of said piston rod assembly and engageable therewith in response to release of the load thereon to absorb the energy of impact of said piston rod assembly, said multi-stage shock-absorber including a resilient cushioning element having a first portion engageable and and compressible by a first portion of a piston face and having a second portion sequentially engageable and compressible by a second portion of the piston face, means for relieving the pressure in said chambers, and means for advancing said piston rod assembly to load-receiving position.

2. A combination as defined in claim 1, wherein said first portion of said resilient cushioning element provides a first energy-absorbing portion and said second portion of said resilient cushioning element provides a second energy-absorbing portion, said first portion being disposed closer to the piston than said second portion whereby the piston is caused to engage said first portion in advance of its engagement with said second portion.

3. A combination as defined in claim 2, wherein said second portion of said resilient cushioning element has a greater energy absorption characteristic than said first portion.

4. In a fluid-pressure operated power tool, the combination of a pressure cylinder housing, a piston rod mounted for axial movement within said cylinder and adapted to engage a work load, a plurality of pistons affixed to said piston rod in axially-spaced relationship thereon to provide a piston rod assembly, a baffle element movably mounted on said piston rod intermediate each pair of pistons and defining a plurality of pressure chambers within said cylinder, means for selectively supplying fluid under pressure to one face of said pistons to cause retraction of said piston rod assembly under load, a multi-stage shock-absorber disposed in the path of retractive movement of said piston rod assembly and engageable therewith in response to release of the load thereon to absorb the energy of impact of said piston rod assembly, said multi-stage shock absorber comprising a resilient cushioning element mounted intermediate the non-pressure faces of said baffle element and its adjacent piston and axially movable relatively to said piston, said resilient cushioning element being bodily movable in one direction in response to pressure-induced piston impact thereon, and said resilient cushioning element being bodily movable in the opposite direction in response to fluid pressure on the pressure face of said baffle element, whereby said resilient cushioning element is movable and compressible between said baffle element and piston, means for relieving the pressure in said chambers, and means for advancing said piston rod assembly to load-receiving position.

5. In a fluid-pressure operated power tool, the combination of a pressure cylinder housing, a piston rod mounted for axial movement within said cylinder and adapted to engage a work load, a plurality of pistons affixed to said piston rod in axially-spaced relationship thereon to provide a piston rod assembly, a baffle element movably mounted on said piston rod intermediate each pair of pistons and defining a plurality of pressure chambers within said cylinder, means for selectively supplying fluid under pressure to one face of said pistons to cause retraction of said piston rod assembly under load, means mounted in said cylinder intermediate each said baffle element and an adjacent piston to limit pressure-induced movement of said baffle element, a multi-stage shock-absorber disposed in the path of retractive movement of said piston rod assembly and engageable therewith in response to release of the load thereon to absorb the energy of impact of said piston rod assembly, means for relieving the pressure in said chambers, and means for advancing said piston rod assembly to load-receiving position.

6. In a pneumatic power tool, the combination of a pressure cylinder, a piston rod mounted for axial movement within said cylinder and adapted to engage a work load, a plurality of pistons affixed to said piston rod in uniformly axially-spaced relationship to provide a piston rod assembly, movably mounted baffle elements disposed within said cylinder and defining a plurality of pressure chambers therein in association with said pistons, means for selectively supplying gas under pressure to said chambers to impose a pressure force on one face of each of said pistons and an opposed face of each of said baffle elements whereby to urge said pistons and said baffle elements to move in opposite directions, retaining means disposed in said path of movement of said baffle elements to limit the movement thereof, shock absorbing means carried by said baffle elements in the said path of movement of said pistons and engageable therewith in response to sudden release of the load on said piston rod assembly, whereby said shock absorbing means and baffle elements are displaced by said piston rod assembly to yieldably absorb the no-load impact energy thereof, means for relieving the pressure in said chambers, and means for restoring said piston rod assembly to load-receiving position.

7. A combination as defined in claim 6, wherein said shock-absorbing means comprise resilient annular rings of smaller diameter than said pistons, and the face of each piston is recessed to receive said ring.

8. A combination as defined in claim 6, wherein said last-named means is a compression coil spring mounted in said cylinder and engaging said piston rod assembly in opposition to the pressure forces acting thereon.

9. A combination as defined in claim 6, wherein said piston rod is hollow and is provided with longitudinally-spaced openings each communicating with a pressure chamber within said cylinder, and said cylinder is provided with a gas port communicating with one of said chambers, whereby said gas under pressure is distributed to all of said chambers.

10. A combination as defined in claim 9, including a hollow co-axial sleeve mounted within said piston rod and providing a material passageway therethrough.

11. In a fluid-pressure operated power tool, the combination of a pressure cylinder housing, a piston rod assembly mounted for axial movement within said cylinder and adapted to engage a work load, means for selectively supplying fluid under pressure to said cylinder to cause displacement of said piston rod assembly to a first position of rest defined by a first abutment, means carried by said housing and engaging said piston rod assembly to yieldably urge said piston rod assembly in an opposite direction to a second position of rest defined by a second abutment, said first and second positions of rest defining the maximum stroke of said piston rod assembly normally-closed work load-clamping means associated with said piston rod and movable therewith, and a third abutment adjustably carried by said housing in the path of movement of said piston rod assembly to urge said clamping means to an open position of selected size, said third abutment being selectively movable to define a third position of rest alternative to said second position of rest and intermediate said first and second positions of rest to shorten the operative stroke of said piston rod assembly and correspondingly cause relative axial displacement of the opening position of said clamping means.

12. A combination as defined in claim 11, wherein said work load-clamping means comprise a plurality of movable spring-loaded normally-closed clamping jaws defining a variable opening therebetween, said third abutment is disposed in the path of movement of said clamping jaws and including means responsive to the engagement of said clamping jaws with said abutment for causing opening of said jaws.

13. A combination as defined in claim 12, wherein said abutment means is selectively movable relatively to said clamping jaws for varying the extent of opening of said jaws.

References Cited
UNITED STATES PATENTS

| | | | |
|---|---|---|---|
| 2,088,859 | 8/1937 | Huck | 72—391 |
| 2,143,429 | 1/1939 | Auble | 72—453 |
| 3,032,771 | 5/1962 | Bisbing | 72—391 |
| 3,082,898 | 3/1963 | Bosck | 72—391 |
| 3,181,338 | 5/1965 | Zetterlund | 72—391 |
| 3,196,662 | 7/1965 | Simmons | 72—391 |
| 3,255,675 | 6/1966 | Reeve | 92—151 |
| 3,323,346 | 6/1967 | Spangler | 72—453 |

CHARLES W. LANHAM, Primary Examiner

G. P. CROSBY, Assistant Examiner

U.S. Cl. X.R.

72—453